(12) United States Patent
Clodfelter

(10) Patent No.: US 6,952,990 B1
(45) Date of Patent: Oct. 11, 2005

(54) LAND MINE OVERPASS TREAD DESIGN

(75) Inventor: James F. Clodfelter, Vienna, VA (US)

(73) Assignee: Niitek Inc., Fairfax, VA (US)

( * ) Notice: Subject to any disclaimer, the term of this patent is extended or adjusted under 35 U.S.C. 154(b) by 0 days.

(21) Appl. No.: 10/244,007

(22) Filed: Sep. 16, 2002

(51) Int. Cl.[7] .............................. B64D 1/04; F41F 5/00
(52) U.S. Cl. ............................ 89/1.13; 36/113; 36/7.5; 36/7.8; 102/402; 102/403; 152/155; 152/209.18; 89/36.08; 89/36.05; 89/36.09; 89/1.1; 89/1.11
(58) Field of Search .............................. 89/1.13, 36.05, 89/36.08, 36.09, 1.11, 1.1; 36/7.9, 7.5, 88, 36/114, 7.8, 7.1 R, 29, 116, 113; 296/204; 102/402, 403

(56) References Cited

U.S. PATENT DOCUMENTS

| | | | | |
|---|---|---|---|---|
| 2,205,073 A | * | 6/1940 | Smit ........................... 36/59 C |
| 2,303,744 A | * | 12/1942 | Jacobs ........................... 36/29 |
| 2,627,676 A | * | 2/1953 | Hack ............................. 36/29 |
| 2,720,714 A | * | 10/1955 | Flynn et al. ................... 36/7.5 |
| 2,990,026 A | * | 6/1961 | Albee ......................... 180/65.6 |
| 3,061,951 A | * | 11/1962 | Barron .......................... 36/7.5 |
| 3,243,898 A | | 4/1966 | Lewis, Jr. et al. ............. 36/7.5 |
| 3,318,024 A | * | 5/1967 | Fujinaka et al ................ 36/85 |
| 3,516,181 A | * | 6/1970 | Jordan .......................... 36/7.5 |
| 3,626,804 A | * | 12/1971 | Paramythioti ................ 89/1.11 |
| 3,733,721 A | * | 5/1973 | Clemens ..................... 36/32 R |
| 3,771,413 A | * | 11/1973 | Sieg et al. .................... 89/1.13 |
| 4,089,565 A | * | 5/1978 | Loegering et al. ............ 305/45 |
| 4,098,011 A | * | 7/1978 | Bowerman et al. ........... 36/129 |
| 4,194,310 A | * | 3/1980 | Bowerman .................... 36/128 |
| 4,249,588 A | * | 2/1981 | Egan ........................... 152/564 |
| 4,378,643 A | * | 4/1983 | Johnson ....................... 36/129 |
| 4,525,941 A | * | 7/1985 | Ruth, Jr. ....................... 36/116 |
| 4,565,412 A | * | 1/1986 | Comminge et al. ........... 305/53 |
| 4,590,123 A | * | 5/1986 | Hashimoto et al. ...... 428/316.6 |
| 4,611,411 A | * | 9/1986 | Ringler et al. ................. 36/7.5 |
| 4,676,009 A | * | 6/1987 | Davis et al. ................... 36/7.8 |
| 4,723,585 A | * | 2/1988 | Mechtel ................. 152/209.16 |
| 4,773,298 A | * | 9/1988 | Tischer et al. ............... 89/1.13 |
| 4,909,128 A | * | 3/1990 | Grinwald .................... 89/1.13 |

(Continued)

FOREIGN PATENT DOCUMENTS

CA     2234597    * 10/1999

(Continued)

Primary Examiner—Michael J. Carone
Assistant Examiner—Daniel Lawson Greene, Jr.
(74) Attorney, Agent, or Firm—James Creighton Wray; Meera P. Narasimhan

(57) ABSTRACT

A land mine pressure fuse avoidance system has a base. A tread on the base contacts the ground around a land mine and independently distributes pressures around the ground. The tread has plural independent closed cell foam rubber elements. Each element is separated from adjacent elements for independently supporting only a portion of a load on the base, while other similarly independent elements support remaining portion of the load. The base is a cylindrical tire, a continuous track, a shoe sole attachment or a robotic foot, and the tread is conformed to and extends outward from the base. The independent elements of the tread are made of closed cell foam rubber formed as a tread on the base with notches between adjacent elements of the tread. Notches extend longitudinally along the tread, and notches extend across the tread, forming block shaped elements extending from the base. The notches extend into the tread for distances greater than heights above ground of clutter and of partially buried mines or fuses. In one form the tread has independent radially extending elements constructed of closed cell foam.

27 Claims, 2 Drawing Sheets

U.S. PATENT DOCUMENTS

| | | | | |
|---|---|---|---|---|
| 5,002,109 | A * | 3/1991 | Shepler et al. | 152/209.8 |
| 5,007,325 | A * | 4/1991 | MacWatt | 89/1.13 |
| D319,138 | S * | 8/1991 | Hart | D21/413 |
| 5,176,765 | A * | 1/1993 | Yamaguchi et al. | 152/209.7 |
| 5,189,243 | A * | 2/1993 | Hambric | 89/1.13 |
| 5,198,608 | A * | 3/1993 | Cahill et al. | 89/1.13 |
| 5,301,441 | A * | 4/1994 | Kownacki | 36/7.8 |
| 5,351,734 | A * | 10/1994 | Mouri et al. | 152/209.4 |
| 5,663,520 | A | 9/1997 | Ladika et al. | 89/36.08 |
| 5,786,542 | A * | 7/1998 | Petrovich et al. | 89/1.13 |
| 5,892,360 | A * | 4/1999 | Willer et al. | 324/326 |
| 5,896,680 | A * | 4/1999 | Kim et al. | 36/28 |
| 5,926,977 | A * | 7/1999 | Sanders | 36/84 |
| 5,979,289 | A * | 11/1999 | French | 89/1.13 |
| 5,979,290 | A * | 11/1999 | Simeone | 89/1.13 |
| 5,988,037 | A * | 11/1999 | Haughom et al. | 89/1.13 |
| 5,992,056 | A * | 11/1999 | Lohrmann | 36/44 |
| 6,006,646 | A * | 12/1999 | Makris et al. | 89/36.05 |
| 6,082,024 | A * | 7/2000 | Del Biondi | 36/28 |
| 6,115,945 | A * | 9/2000 | Ellis, III | 36/102 |
| 6,212,799 | B1 * | 4/2001 | Gingerich et al. | 37/246 |
| 6,279,631 | B1 * | 8/2001 | Tuggle | 152/375 |
| 6,478,387 | B1 * | 11/2002 | Rayman | 305/19 |
| 6,505,421 | B1 * | 1/2003 | Vaz | 36/30 R |
| 6,655,051 | B1 * | 12/2003 | Peche et al. | 36/103 |
| 6,725,572 | B1 * | 4/2004 | Krstic | 36/25 R |
| 6,751,892 | B2 * | 6/2004 | Chavet et al. | 36/113 |
| 2003/0172554 | A1 * | 9/2003 | Chavet et al. | 36/113 |

FOREIGN PATENT DOCUMENTS

| | | | |
|---|---|---|---|
| DE | 3841303 A1 | * | 6/1990 |
| JP | 6-74695 | * | 3/1994 |
| WO | WO 02/03007 | * | 6/2001 |

* cited by examiner

LAND MINE OVERPASS TREAD DESIGN

BACKGROUND OF THE INVENTION

Land mines are dangerous and claim the lives of thousands of soldiers or innocent civilians every year. Most land mines are detonated by a pressure-activated fuse. The pressure required to activate those fuses range from ounces to many pounds. Anti-personnel mines typically require one or so pounds to detonate. The overwhelming majority of anti-tank mines require several pounds of pressure to detonate.

A large worldwide community is dedicated to ridding the world of future and already emplaced land mines. Various governments and humanitarian efforts are developing land mine detection systems to pinpoint the locations of land mines so personnel and equipment can avoid the mines that might detonate and cause damage. All efforts including the day-to-day civilian activities in mined countries could benefit from mine-overpass-capabilities.

The countermine community typically assumes that low ground pressure vehicles automatically create a mine overpass capability. Low ground pressure vehicles could be lightweight vehicles with very wide air-filed tires, or lightweight vehicles with wide flat tracks like a lightweight bulldozer, or a hovercraft.

Low ground pressure does not automatically mean low mine pressure. Low mine fusing mechanism pressure is the problem to be solved. For pressure-fused mines, pressure on the mine's trip-mechanism causes it to detonate. A low ground pressure vehicle with a large contact patch on flat ground could have an extremely low ground pressure but a mine-fuse pressure that is half or all of its weight.

When a large stone, for example, is placed over a mine an entire soft-tire may be lifted from the ground so that a quarter of a vehicle's weight bears on the stone. When the tire is lifted, the stone transmits that entire force from one tire to the mine fuse.

Assume for a moment that a human weighs 200 pounds and has two feet in boots with extremely stiff soled shoes that are perfectly flat with 50 square inches that touch the ground. This human's pressure on the ground is about 4 pounds per square inch (200/50). If on the other hand the human steps on a partially buried mine with one foot as he or she is walking, the pressure on that mine's trip-mechanism could be as much as 200 pounds.

Needs exist for improved ground contact apparatus and methods to avoid triggering mines while moving in mined areas.

SUMMARY OF THE INVENTION

A land mine pressure fuse avoidance system has a base. A tread on the base contacts the ground around a land mine and independently distributes pressures around the ground. The tread has plural independent closed cell foam rubber elements. Each element is separated from adjacent elements for independently supporting only a portion of a load on the base, while other similarly independent elements support remaining portion of the load. The base is a cylindrical tire, a continuous track, a shoe sole attachment or a robotic foot, and the tread is conformed to and extends outward from the base. The independent elements of the tread are made of closed cell foam rubber formed as a tread on the base with notches between adjacent elements of the tread. Notches extend longitudinally along the tread, and notches extend across the tread, forming block shaped elements extending from the base. The notches extend into the tread for distances greater than heights above ground of clutter and of partially buried mines or fuses. In one form the tread has independent radially extending elements constructed of closed cell foam.

An improvement is to make a very soft tread to encourage the mine or covering clutter to move into the tread and let some part of the weight flow around the mine through the tread and onto the ground. Minimizing mine-fuse pressure is helped by letting the tread material flow around the mine's fuse to make contact with the perimeter of the mine and the ground.

This invention provides notched, thick, closed cell foam rubber tread for any part of a land mine overpass platform that contacts the ground. Land mine overpass platforms, might be humans, manned-vehicles, unmanned vehicles, or legged robots with tires, tracks or feet that contact the ground.

A conceptual land mine detection system includes a remotely controlled cart and a land mine detection sensor. Notched closed cell foam rubber tires or tread material is used to minimize land mine detonations while passing over land mines.

A closed cell foam rubber notched tire rests on the ground. Sidewall parts of the closed-cell foam rubber are not notched and stretch-fit over a rim. Many notches are cut into the foam rubber tread. The notches extend from the perimeter of the tire to some depth that is greater than most clutter objects and mines that the tire must pass over without detonating. The notches are an important part of the invention, as they prevent nearby notch-separated foam elements from exerting pressure on the mine's fusing mechanism. Equally important is the down-track contact length that the tire makes with the ground. It is important that the closed-cell foam rubber tire material be of a resiliency to permit a maximum contact area with the ground while providing adequate stability for the platform. The resiliency of the foam will vary depending on the weight of the platform and the speed at which it must maneuver.

When encountering a partially buried mine, the invention sits over and conforms to the mine that is buried in the ground. The closed cell foam retracts to allow the mine to move into the foam. The molding around the mine lets the foam rubber elements touch the ground and minimizes pressure on the land mine's fusing mechanism. Many parts of the tread touch the ground and therefore minimize the pressure on the land mine's fuse by transferring a maximum of the vehicle's weight to the ground. If the notches were not present, more of the tread would be suspended above the ground and more pressure would be dangerously on the mine's fusing mechanism.

When a completely buried mine is covered with a clutter object, such as a rock, the invention conforms to the clutter object by compressing and creates more uniform ground pressure and therefore minimum pressure on the clutter object. Because the clutter object is over the mine, minimizing the pressure on the clutter object also minimizes the pressure on the mine's fusing mechanism.

A human wearing a boot fastens the invention using straps with Velcro or buckles. A more rigid backing is used for the foam rubber tread. The rigid backing is approximately 1-centimeter thick durable plastic and is fastened to the foam rubber using adhesive. The notched foam rubber compresses over a mine to give maximum contact with the ground.

The invention is also used for a tracked vehicle. The tracked vehicle chassis is carried by closed cell foam treads that are notched. The tracks are driven by drive wheels and rollers. The notched foam rubber tread conforms around the mine to give maximum contact with the ground. Tracked vehicles give very low ground pressure, because the contact with the ground is very long with an infinite radius relative to round tires. Tracked vehicles with hard tread, however translate tremendous weight to the mines fusing mechanism. This invention, with its soft, notched tread, minimizes the pressure exerted on the mines fusing mechanism.

The invention is also used on robots with legs rather than wheels or tracks. The robot may have many legs like an insect. The body carries power and a motor drive mechanism. Legs are attached to the body. The invention is attached to the legs and has feet with flexible bases and closed cell foam rubber treads with notches. The notches conform around partially buried mines that are in the ground. The foam rubber contact with the ground is maximized, therefore minimizing the pressure on the land mine's fusing mechanism.

An improvement makes a very soft sole to encourage the mine to move into the sole and let some part of the weight flow around the mine and onto the ground.

This invention proposes using notched, thick, closed cell foam rubber tread for any part of a landmine overpass platform that contacts the ground. Landmine overpass platforms might be humans, manned vehicles, unmanned vehicles, or legged robots that contact the ground.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
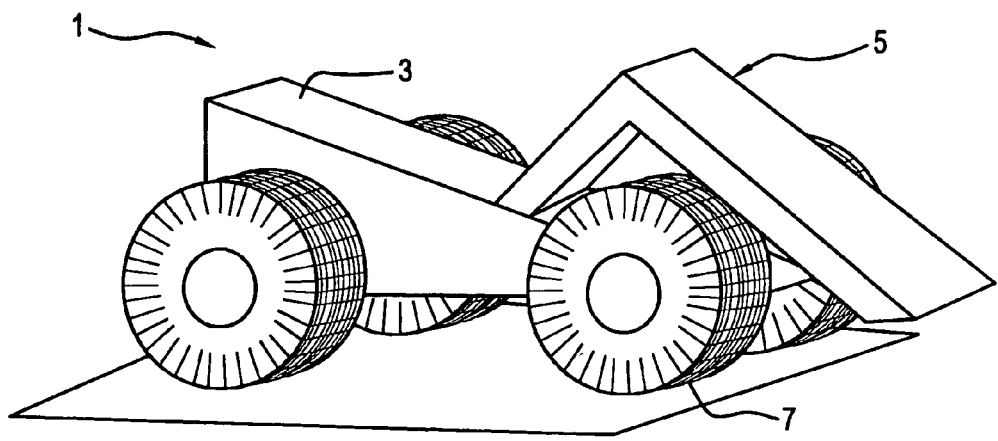
FIG. 1 shows a land mine removing or destroying vehicle using notched foam rubber wheels.

Referring to FIG. 1, a land mine detection vehicle system is generally indicated by the numeral 1. The system includes a remotely controlled cart 3 and a land mine detection sensor 5. The vehicle 1 is supported on notched closed cell foam rubber tire 7 and tread material used to minimize land mine detonations while passing over land mines.

Figure 2A:
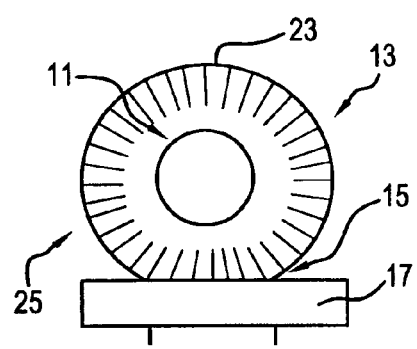
FIG. 2A schematically shows a side view of a notched foam rubber tire.

Referring to FIG. 2A, a notched closed cell foam rubber tire rests on the ground 17. A part 11 of the closed-cell foam rubber is not notched and stretch-fits over a rim 21. Many notches 13 are cut into the foam rubber. The notches 13 extend from the perimeter 23 of the tire 25 to some depth that is greater than the height of most clutter objects and mines that it must pass over without detonating a mine. The notches 13 are an important part of the invention, as they prevent nearby notched foam elements from exerting pressure on the mine's fusing mechanism. Equally important is the down-track contact length 15 that the tire 25 makes with the ground 17.

Figure 2B:
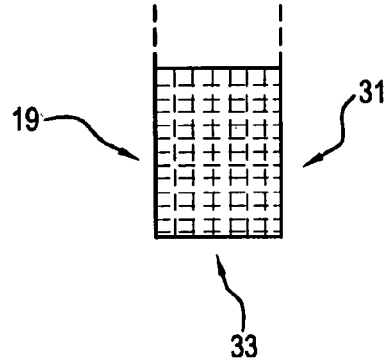
FIG. 2B shows a notched foam rubber tire footprint.

Referring to FIG. 2B, a notched foam rubber tire footprint 19 has tire tread width 31 and tire footprint length 33.

It is important that the closed-cell foam rubber tire material be of a resiliency to permit a maximum contact area with the ground while providing adequate stability for the platform. The resiliency of the foam will vary depending on the weight of the platform and the speed at which it must maneuver.

Figure 3:
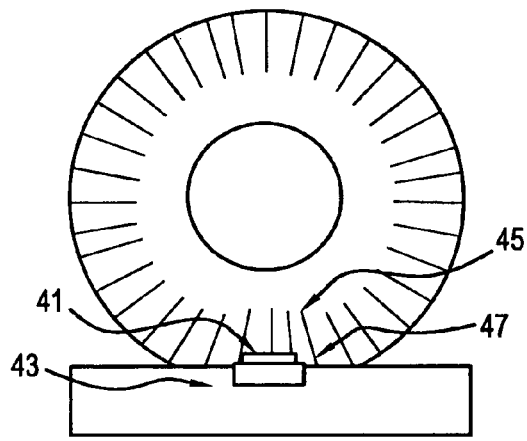
FIG. 3 shows pressure distribution in a side elevation of a notched foam rubber tire.

Referring to FIG. 3, when the present invention encounters a partially buried mine 41, the invention sits over and conforms to the mine 41 that is buried in the ground 43. The closed cell foam 45 retracts to allow the mine 41 to move into the foam. The molding around the mine 41 lets the foam rubber elements touch the ground 47 and minimizes pressure on the land mine's fusing mechanism. Many parts of the tread touch the ground and therefore minimize the pressure on the land mine's fuse by transferring a maximum of the vehicle's weight to the ground 43. If the notches were not present, more of the tread would be suspended above the ground, and more pressure would be dangerously on the mine's fusing mechanism.

Figure 4:
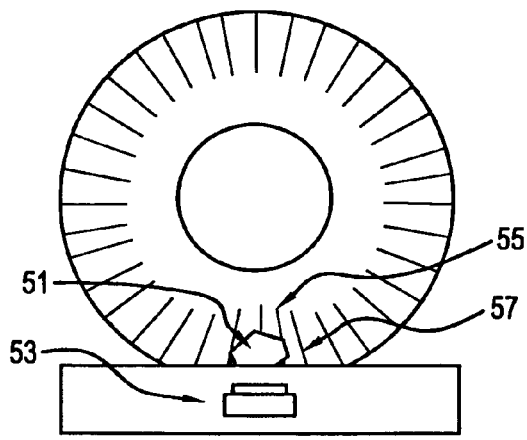
FIG. 4 shows a buried mine covered by clutter and pressure distribution in a side elevation cross-section of a notched foam rubber tread.

Referring to FIG. 4, when a completely buried mine 53 is covered with a clutter object 51, such as a rock, the invention conforms to the clutter object 51 by compressing 55 and creates more uniform ground pressure and therefore minimum pressure on the clutter object 51. Because the clutter object is over the mine 53, minimizing the pressure on the clutter object 51 also minimizes the pressure on the mine's fusing mechanism.

Figure 5:
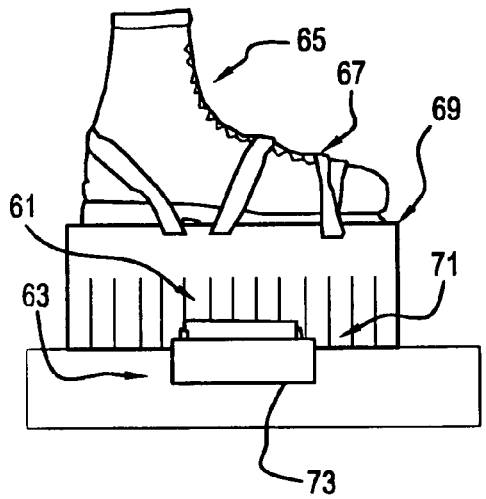
FIG. 5 is a side elevation of a boot with a strapped-on notched foam rubber boot base.

Referring to FIG. 5, a human wearing a boot 65 fastens to the invention using straps 67 with Velcro or buckles. A more rigid backing 69 is used for the foam rubber tread 71. The rigid backing 69 is approximately 1-centimeter thick durable plastic and is fastened to the foam rubber using adhesive. The notched foam rubber compresses 61 over the mine 73 to give maximum contact with the ground 63.

Figure 6:
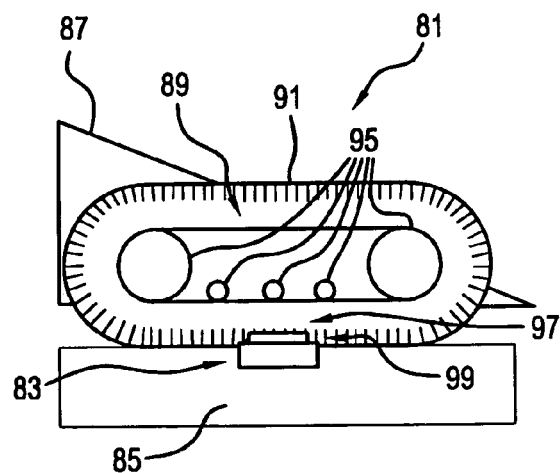
FIG. 6 shows a side elevation in cross section of a vehicle continuous track with a notched foam rubber tread.

Referring to FIG. 6, the invention is also used for a tracked vehicle 81. A mine 83 is partially buried in the ground 85. The tracked vehicle chassis 87 is carried by closed cell foam treads 89 that are notched 91. Drive wheels and rollers 95 drive the tracks. The notched foam rubber tread conforms 97 around the mine 83 to give maximum contact 99 with the ground 85. Tracked vehicles give very low ground pressure because the contact with the ground is very long with an infinite radius relative to the round tires. Tracked vehicles with hard tread, however translate tremendous weight to a mines' fusing mechanism. This invention, with its soft, notched tread, minimizes the pressure exerted on the mines fusing mechanism.

Figure 7:
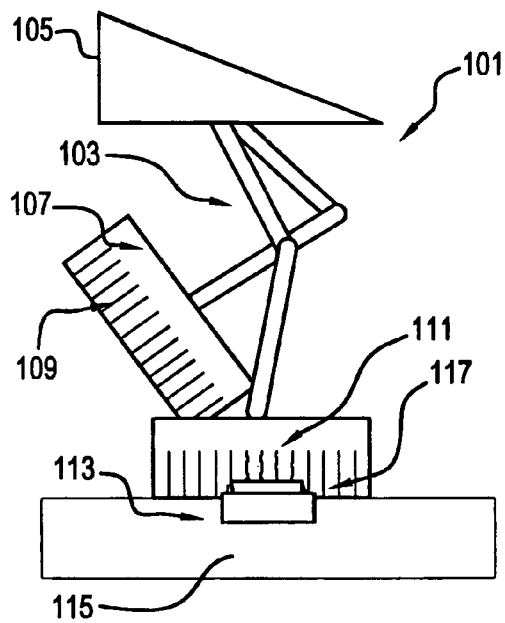
FIG. 7 shows notched foam rubber tread feet on a mechanical robot.

Referring to FIG. 7, the invention 107 is also used on robots 101 with legs 103 rather than wheels or tracks. The robot 101 may have many legs 103 like an insect. The body 105 carries power and a motor drive mechanism. Legs 103 are attached to the body 105. The invention 107 is attached to the legs 103 and has notches 109. These notches 109 conform 111 around a partially buried mine 113 that is in the ground 115. The foam rubber contact with the ground is maximized 117, therefore minimizing the pressure on the land mine's fusing mechanism.

The above descriptions and FIGS. 1–7 show foam-filled notched treads.

Figure 8A:
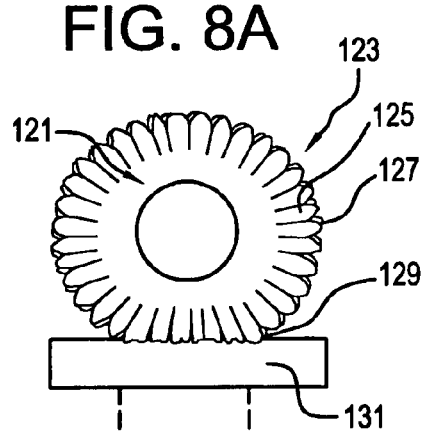
FIG. 8A is a partial cross-section of air-filled rubber protrusions from an air-filled tire.

FIG. 8A adds an air-filled tire with air-filled treads. The treads are like the fingers on a surgical rubber glove after it has been filled with air, except they are closer together. Both devices (foam or air version) will give adequately low ground pressure. The air-filled tire may allow for lower manufacturing costs, lower weight and longer life between failures.

Figure 8B:
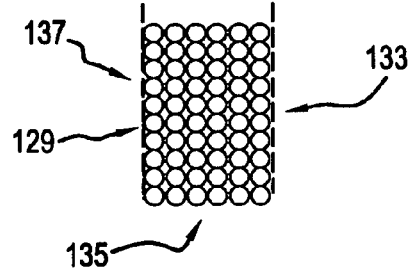
FIG. 8B shows the tire tread footprint of the tire of FIG. 8.

FIGS. 8A and 8B show a soft pneumatic tire 121 with closely laterally adjacent air-filled fingers 123 with cylindrical shapes 125 and tapered ends 127, which provide a large weight-distributing footprint 129 upon the ground 131.

Similar pneumatic bases and air-filled fingers for treads may be used as show attachments or as ground-engaging parts for tracked vehicles or robots.

Referring to FIG. 8B, an air-filled tire footprint has tire tread width 133 and tire footprint length 135. The two-dimensional contact area 137 represents the down-track contact length that the tire makes with the ground.

While the invention has been described with reference to specific embodiments, modifications and variations of the invention may be constructed without departing from the scope of the invention, which is defined in the following claims.

I claim:

1. A land mine pressure fuse avoidance system comprising a base, a tread on the base for contacting ground around a land mine and for distributing pressures around the ground, the tread comprising plural independent closed cell foam rubber elements, each element spaced from adjacent elements for independently supporting only a portion of a load on the base while other independent elements together support remaining portions of the load, wherein the base is a cylindrical tire, continuous track, or shoe sole attachment and the tread is conformed to and extends outward from the base, wherein each independent element is a closed cell foam rubber cylindrically formed as a tread on the base with notches between adjacent elements of the tread, wherein the notches are formed across the base and the closed cell foam rubber elements extend across the base.

2. The apparatus of claim 1, wherein the base has side walls stretched into rims of a vehicle and wherein the base is filled with foam or air.

3. A land mine pressure fuse avoidance system comprising a base, a tread on the base for contacting ground around a land mine and for distributing pressures around the ground, the tread comprising plural independent closed cell foam rubber elements each element separated from adjacent elements, an independent support formed by each of the elements for independently supporting only a portion of a load on the base while other similarly independent elements together support remaining portions of the load, wherein the base is a cylindrical tire, continuous track, or shoe sole attachment and the tread is conformed to and extends outward from the base, wherein each independent element is a closed cell foam rubber cylindrically formed as a tread on the base with notches between adjacent elements of the tread, and wherein the notches extend into the tread for distances greater than heights above ground of clutter or of partially buried mines or fuses.

4. The apparatus of claim 3, wherein the base is filled with foam or air and wherein the independent elements radially extend therefrom.

5. The apparatus of claim 3, wherein the base is a continuous track and the plural independent closed cell foam rubber elements are spaced laterally and longitudinally from next adjacent elements.

6. The apparatus of claim 3, wherein the notches extend longitudinally along the tread separating the elements as longitudinal elements.

7. The apparatus of claim 6, wherein the notches extend across the tread, forming block shaped elements extending from the base.

8. A land mine pressure fuse avoidance system comprising a base, a tread on the base for contacting ground around a land mine and for distributing pressures around the ground, the tread comprising plural independent closed cell foam rubber elements, each element spaced from adjacent elements for independently supporting only a portion of a load on the base while other independent elements together support remaining portions of the load, wherein the base is a vehicle track and wherein the independent closed cell foam elements are separated from laterally and longitudinally adjacent elements.

9. A land mine pressure fuse avoidance system comprising a base, a tread on the base for contacting ground around a land mine and for distributing pressures around the ground, the tread comprising plural independent closed cell foam rubber elements, each element spaced from adjacent elements for independently supporting only a portion of a load on the base while other independent elements together support remaining portions of the load, wherein the base is a vehicle track and wherein the independent closed cell foam elements are separated from longitudinally adjacent elements.

10. A land mine pressure fuse avoidance system comprising a base, a tread on the base for contacting ground around a land mine and for distributing pressures around the ground, the tread comprising plural independent closed cell foam rubber elements, each element spaced from adjacent elements for independently supporting only a portion of a load on the base while other independent elements together support remaining portions of the load, wherein the base is a vehicle track and wherein the independent closed cell foam elements are separated from laterally adjacent elements.

11. A method of avoiding triggering of pressure operated land mines comprising providing a base, providing a tread on the base for contacting ground around a land mine and independently distributing pressures around the ground, wherein the providing a tread comprises providing plural independent closed cell foam rubber elements each element separated from adjacent elements, independently supporting only a portion of a load on the base with some of the elements, while simultaneously supporting remaining portions of the load with other independent elements acting together.

12. A method of avoiding triggering of pressure operated land mines comprising providing a base, providing a tread on the base for contacting ground around a land mine and independently distributing pressures around the ground, wherein the providing a tread comprises providing plural independent closed cell foam rubber elements each element separated from adjacent elements, independently supporting only a portion of a load on the base with some of the elements, while simultaneously supporting remaining portions of the load with other independent elements acting together, wherein the providing the base comprises providing a cylindrical tire, a continuous track, or a shoe sole attachment and providing the tread comprises conforming the elements to the base and extending the elements outward from the base.

13. The method of claim 12, wherein the providing the notches further comprises extending the notches into the tread for distances greater than heights above ground of clutter or of partially buried mines or fuses.

14. The method of claim 12, wherein the providing the tread comprises providing a closed cell foam rubber cylinder formed as a tread on the base with notches between adjacent elements of the tread.

15. The method of claim 14, wherein the providing notches comprises forming the notches across the base and the providing the closed cell foam rubber elements comprises extending the elements across the base.

16. The method of claim 14, wherein the providing the notches comprises extending the notches longitudinally along the tread and separating the elements as longitudinal elements.

17. The method of claim 16, wherein the providing the notches further comprises extending the notches across the tread and forming block shaped elements extending from the base.

18. A method of avoiding triggering of pressure operated land mines comprising providing a base, providing a tread on the base for contacting ground around a land mine and independently distributing pressures around the ground, wherein the providing a tread comprises providing plural independent closed cell foam rubber elements each element separated from adjacent elements, independently supporting only a portion of a load on the base with some of the elements, while simultaneously supporting remaining portions of the load with other independent elements acting together, wherein the providing the base comprises providing a tire having side walls stretched to rims of a vehicle and providing the tire further comprises filling the tire with foam or air.

19. A method of avoiding triggering of pressure operated land mines comprising providing a base, providing a tread on the base for contacting ground around a land mine and independently distributing pressures around the ground, wherein the providing a tread comprises providing plural independent closed cell foam rubber elements each element separated from adjacent elements, independently supporting only a portion of a load on the base with some of the elements; while simultaneously supporting remaining portions of the load with other independent elements acting together, wherein the providing the base comprises providing a cylindrical tire, filling the tire with foam or air, and wherein the providing the tread comprises providing independent radially extending elements constructed of closed cell foam.

20. A method of avoiding triggering of pressure operated land mines comprising providing a base, providing a tread on the base for contacting ground around a land mine and independently distributing pressures around the ground, wherein the providing a tread comprises providing plural independent closed cell foam rubber elements each element separated from adjacent elements, independently supporting only a portion of a load on the base with some of the elements, while simultaneously supporting remaining portions of the load with other independent elements acting together, wherein the providing the base comprises providing continuous vehicle track and wherein the providing the tread comprises providing the independent closed cell foam elements separated from laterally and longitudinally adjacent elements.

21. A method of avoiding triggering of pressure operated land mines comprising providing a base, providing a tread on the base for contacting ground around a land mine and independently distributing pressures around the ground, wherein the providing a tread comprises providing plural independent closed cell foam rubber elements each element separated from adjacent elements, independently supporting only a portion of a load on the base with some of the elements, while simultaneously supporting remaining portions of the load with other independent elements acting together, wherein the providing the base comprises providing a vehicle track and wherein the providing the tread comprises providing the independent closed cell foam elements separated from longitudinally adjacent elements.

22. A method of avoiding triggering of pressure operated land mines comprising providing a base, providing a tread on the base for contacting ground around a land mine and independently distributing pressures around the ground, wherein the providing a tread comprises providing plural independent closed cell foam rubber elements each element separated from adjacent elements, independently supporting only a portion of a load on the base with some of the elements, while simultaneously supporting remaining portions of the load with other independent elements acting together, wherein the providing the base comprises providing a vehicle track and wherein the providing the tread comprises providing the independent closed cell foam elements separated from laterally adjacent elements.

23. A method of avoiding triggering of pressure operated land mines comprising providing a base, providing a tread on the base for contacting ground around a land mine and independently distributing pressures around the ground, wherein the providing a tread comprises providing plural independent closed cell foam rubber elements each element separated from adjacent elements, independently supporting only a portion of a load on the base with some of the elements, while simultaneously supporting remaining portions of the load with other independent elements acting together, wherein the providing the base comprises providing a continuous track and wherein the providing the elements comprises providing the plural independent closed cell foam rubber elements spaced laterally and longitudinally from next adjacent elements.

24. A method of avoiding detonating of pressure operated land mines comprising evenly distributing weight on a tread of a platform moving over a minefield among a plurality of independent soft rubber protuberances in the tread.

25. The method of claim 24, further comprising laterally and longitudinally spacing and separating the protuberances.

26. The method of claim 24, further comprising notching a continuous closed cell foam rubber tread for forming and separating the protuberances.

27. A method of avoiding detonating of pressure operated land mines comprising evenly distributing weight on a tread of a platform moving over a minefield among a plurality of independent soft rubber protuberances in the tread, further comprising providing a cylindrical, continuous track, shoe or robotic foot pneumatic base and extending the pneumatic rubber protuberances from the base.

* * * * *